United States Patent
Bhan

(10) Patent No.: US 8,618,015 B2
(45) Date of Patent: Dec. 31, 2013

(54) HIGH ACTIVITY HYDRODESULFURIZATION CATALYST, A METHOD OF MAKING A HIGH ACTIVITY HYDRODESULFURIZATION CATALYST, AND A PROCESS FOR MANUFACTURING AN ULTRA-LOW SULFUR DISTILLATE PRODUCT

(75) Inventor: Opinder Kishan Bhan, Katy, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/558,056

(22) Filed: Jul. 25, 2012

(65) Prior Publication Data

US 2012/0292231 A1 Nov. 22, 2012

Related U.S. Application Data

(62) Division of application No. 10/943,756, filed on Sep. 17, 2004, now abandoned.

(51) Int. Cl.
*B01J 27/19* (2006.01)
*B01J 25/00* (2006.01)
*B01J 21/04* (2006.01)
*B01J 23/02* (2006.01)

(52) U.S. Cl.
USPC ............................. 502/321; 502/211; 502/439

(58) Field of Classification Search
USPC .......................................... 502/305–326, 439
See application file for complete search history.

(56) References Cited

U.S. PATENT DOCUMENTS

| | | | |
|---|---|---|---|
| 3,669,904 A | 6/1972 | Cornelius et al. | 252/465 |
| 3,853,789 A | 12/1974 | Warthen et al. | 252/463 |
| 4,066,574 A | 1/1978 | Tamm | 252/439 |
| 4,089,811 A | 5/1978 | Koniz et al. | 252/463 |
| 4,145,316 A | 3/1979 | Robson | 252/465 |
| 4,271,042 A | 6/1981 | Oleck et al. | 252/465 |
| 4,440,956 A | 4/1984 | Couvillion | 585/260 |
| 4,879,265 A | 11/1989 | Simpson et al. | 502/211 |
| 4,891,350 A | 1/1990 | Chopin et al. | 502/439 |
| 5,300,217 A | 4/1994 | Simpson et al. | 208/216 |
| 5,468,709 A | 11/1995 | Yamaguchi et al. | 502/210 |
| 6,429,172 B1 * | 8/2002 | Tsukada et al. | 502/439 |
| 2006/0060510 A1 | 3/2006 | Bhan | 208/213 |

FOREIGN PATENT DOCUMENTS

| | | | |
|---|---|---|---|
| EP | 0357295 | 8/1989 | C10G 49/04 |
| EP | 0601722 | 11/1993 | C10G 45/08 |
| EP | 0300629 | 7/1998 | C10G 49/06 |
| EP | 0972748 | 1/1999 | C10F 7/42 |
| JP | 2003230837 | 6/1998 | C10G 45/08 |

OTHER PUBLICATIONS

ISR of PCT US2005/033248 of Dec. 19, 2005 & Written Opinion of PCT US2005/033248 of Dec. 19, 2005.

* cited by examiner

*Primary Examiner* — Jennifer Smith
(74) *Attorney, Agent, or Firm* — Charles W. Stewart

(57) ABSTRACT

A method of making a high activity catalyst composition suitable for use in the hydrodesulfurization of a middle distillate feed, such as diesel fuel, having a high concentration of sulfur, to thereby provide a low sulfur middle distillate product. The method comprises heat treating aluminum hydroxide under controlled temperature conditions thereby converting the aluminum hydroxide to gamma-alumina to give a converted aluminum hydroxide, and controlling the fraction of converted aluminum hydroxide that is gamma-alumina. A catalytic component is incorporated into the converted aluminum hydroxide to provide an intermediate, which is heat treated to provide the high activity catalyst composition. The high activity catalyst composition can suitably be used in the hydrodesulfurization of a middle distillate feed containing a high sulfur concentration.

22 Claims, 5 Drawing Sheets

Figure 1:
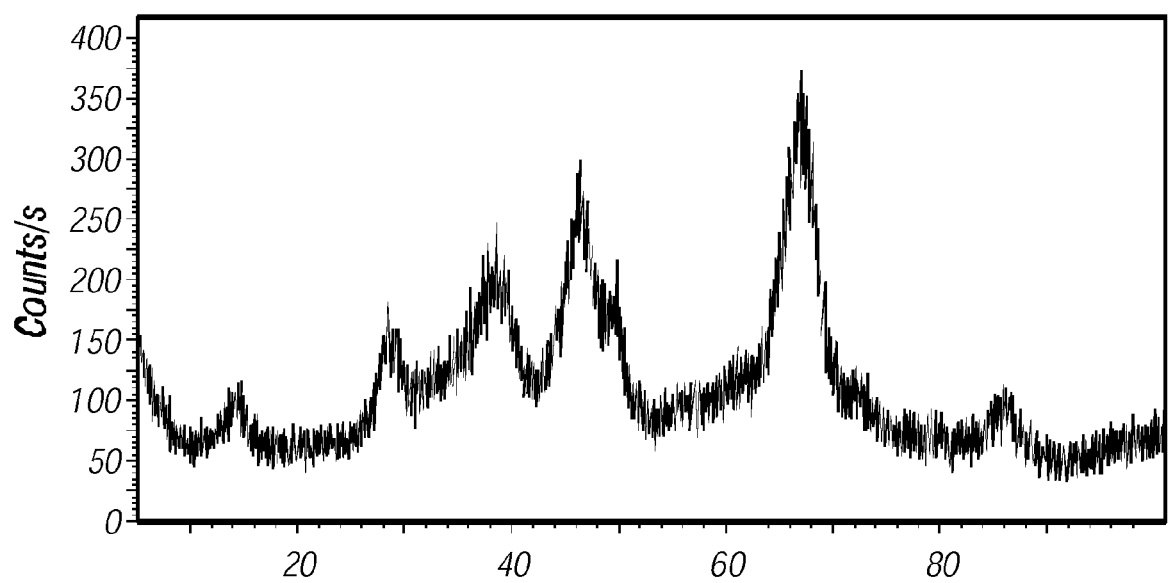

HIGH ACTIVITY HYDRODESULFURIZATION CATALYST, A METHOD OF MAKING A HIGH ACTIVITY HYDRODESULFURIZATION CATALYST, AND A PROCESS FOR MANUFACTURING AN ULTRA-LOW SULFUR DISTILLATE PRODUCT

This is a divisional application of application Ser. No. 10/943,756, filed Sep. 17, 2004, the entire disclosure of which is incorporated herein by reference.

This invention relates to a catalyst and process for the manufacture of a hydrocarbon product having a low sulfur concentration. The invention further relates to a high activity hydrodesulfurization catalyst, a method of making such high activity hydrodesulfurization catalyst, and a process for manufacturing diesel distillate product having a low sulfur concentration using the high activity hydrodesulfurization catalyst.

U.S. Environmental Protection Agency regulations are currently targeting for the year 2006 a limitation on the maximum sulfur concentration in on-road diesel of 15 parts per million (ppm). The European Union will limit the sulfur concentration in diesel fuel starting in the year 2005 to less than 50 ppm. Other organizations are supporting even stricter requirements of as low as 5 to 10 ppm sulfur in diesel. With the current hydrodesulfurization technology, the ability to produce such a low sulfur diesel product is a real challenge, and there are ongoing efforts to develop improvements in the existing hydrodesulfurization technology that will permit the economical hydrodesulfurization of a sulfur-containing diesel feed stream to yield an ultra-low sulfur diesel product.

A conventional hydrodesulfurization process employed to reduce the concentration of organosulfur compounds contained in a hydrocarbon feedstock is typically carried out by contacting the hydrocarbon feedstock with a hydrotreating catalyst in the presence of hydrogen and at an elevated temperature and pressure. A typical hydrotreating catalyst contains a group 6 metal component, such as molybdenum, and a group 9 or group 10 component, such as cobalt or nickel, supported on a refractory oxide support.

One early patent, U.S. Pat. No. 3,669,904, discloses a method of making a gas oil hydrodesulfurization catalyst prepared from a precursor mixture of mildly calcined boehmite and uncalcined boehmite. The disclosed method addresses certain of the disadvantages and limitations with the use of technical grade boehmite in forming extruded pellets for use in making certain catalysts. The gamma alumina pellets are made by mixing a mildly calcined technical grade boehmite with uncalcined technical grade boehmite and an extrusion aid followed by forming a pellet that is calcined.

U.S. Pat. No. 3,853,789 discloses a method of making a mechanically strong alumina extrudate that may be used as a catalyst carrier. The extrudate is prepared by mixing with water specific proportions of gamma alumina powder having a certain particle size and alumina monohydrate (boehmite) having a certain particle size to form an extrudable paste from which an extrudate is formed. The extrudate is dried and then heat-treated at temperatures of 1150 to 1250° F.

U.S. Pat. No. 4,066,574 discloses a catalyst for use in the hydrodesulfurization of a heavy oil feedstock. The catalyst is an alumina support that is impregnated with Group VIB and Group VIII metals or metal compounds. The alumina support has a specific pore structure that provides for certain desired catalyst properties. The alumina support is made by mixing water and a strong mineral acid with amorphous or crystalline hydrate alumina powder to form a paste that is extruded. The density of the extrudate may be controlled by the addition of ammonium hydroxide to the extrudable paste. The extrudate is calcined at a temperature of 500° F. to 1600° F. The support has at least 70 volume percent of its pore volume in pores having a diameter between 80 and 150 Angstroms and less than 3 volume percent of its pore volume in pores having a diameter above 1000 Angstroms.

U.S. Pat. No. 4,089,811 discloses a method of making an alumina catalyst support by calcining alpha alumina monohydrate (boehmite) at a temperature of from about 800° F. to 900° F. to form calcined alumina containing gamma alumina and mixing the calcined alumina with water to form a wetted alumina. The wetted alumina at a pH of from 6 to 12.5 is heated to a temperature of from 190° F. to 250° F. for from 8 to 24 hours to convert the calcined alumina to beta alumina trihydrate. Maintaining the calcination temperature within the range of 800 to 900° F. is important to achieve the desired results. The calcined alumina contains at least about 80% gamma alumina with the remaining portion of the alumina being substantially entirely alpha alumina monohydrate.

U.S. Pat. No. 4,271,042 discloses a desulfurization catalyst that comprises a hydrogenation catalytic component composited with gamma alumina that contains dispersed delta and/or theta phase alumina. The catalyst is prepared by precalcining gamma alumina or boehmite at a temperature of from 1600° F. to 2000° F. to induce the formation of delta and/or theta phase alumina. The resulting powder is then mixed with alpha alumina monohydrate (boehmite) and formed into pellets or extrudates that are calcined at a temperature of from 900° F. to 1400° F. to form a catalyst support consisting of an intimate mixture of gamma alumina with delta and/or theta phase alumina. The catalyst support may be composited with the hydrogenation component.

U.S. Pat. No. 5,300,217 discloses a hydroprocessing catalyst that comprises a hydrogenation component supported on a porous, amorphous refractory oxide containing delta alumina. The finished catalyst contains greater than 5 weight percent delta alumina. The amorphous, porous refractory oxide support material is prepared by extruding a precursor of the desired support, such as a refractory gel, followed by calcination of the extrudate. To obtain the desired delta-gamma alumina combination for the support, it is precalcined, prior to impregnation with the hydrogenation component, at a temperature above about 900° F. and preferably above 1800° F.

With the increasingly stricter sulfur concentration requirements for diesel fuels there is an ongoing need to develop improved catalysts and processes for the manufacture of the low sulfur diesel fuels.

It is, thus, an object of the invention to provide an improved catalyst for use in processes for the manufacture of a distillate product having a low concentration of sulfur.

Another object of the invention is to provide a process for making low sulfur distillate product.

Thus, in accordance with the invention, provided is a catalyst composition that comprises a shaped support material having incorporated therein a catalytic hydrogenation component wherein the shaped support material is a calcined alumina having a material absence of aluminum hydroxide and a material absence of crystalline transitional phase of alumina other than gamma alumina. Another embodiment of the catalyst composition comprises a calcined impregnated shaped support, wherein the shaped support of the impregnated shaped support comprises, prior to its impregnation and calcination, at least 90 weight percent alumina that is in the crystalline transitional phase of gamma-alumina, less than 5 weight percent alumina that is in the crystalline transitional phase of delta-alumina, and less than 5 weight percent alumina that is in the crystalline transitional phase other than gamma-alumina, and wherein the shaped support has incorporated therein a hydrogenation catalytic component thereby providing the impregnated shaped support, and wherein the impregnated shaped support is calcined.

In accordance with another invention is a method of making a catalyst composition useful in the manufacture of a low sulfur distillate product. This method includes providing a shaped support, having a material absence of aluminum hydroxide and a material absence of crystalline transitional phase of alumina, comprising gamma-alumina, and incorporating therein a catalytic component to thereby provide an intermediate, and calcining the intermediate to thereby provide the catalyst composition. Another embodiment of the inventive method of making the catalyst composition includes forming a shaped particle comprising at least 90 weight percent, exclusive of water, boehmite, and calcining the shaped particle under a controlled temperature condition to convert the boehmite of the shaped particle to gamma-alumina. The controlled temperature condition is controlled to within a calcination temperature range of from about 850° F. and 950° F. so that essentially all of the boehmite of the shaped particle is converted to a crystalline transitional phase of alumina but less than a material amount of the boehmite of the shaped particle is converted to a crystalline transitional phase other than gamma-alumina to thereby provide a calcined shaped particle. The calcined shaped particle is impregnated with a hydrogenation catalytic component to thereby provide an impregnated calcined shaped particle that is calcined to thereby provide the catalyst composition.

In accordance with yet another invention is a process for manufacturing a low sulfur distillate product by contacting under hydrodesulfurization conditions a middle distillate hydrocarbon feedstock having a high sulfur concentration with the aforedescribed catalyst or a catalyst made by the aforedescribed method and yielding a low sulfur middle distillate product having a low sulfur concentration.

FIG. 1 presents the X-ray diffraction spectrum for a shaped support calcined at a calcination temperature of 750° F.

Figure 2:
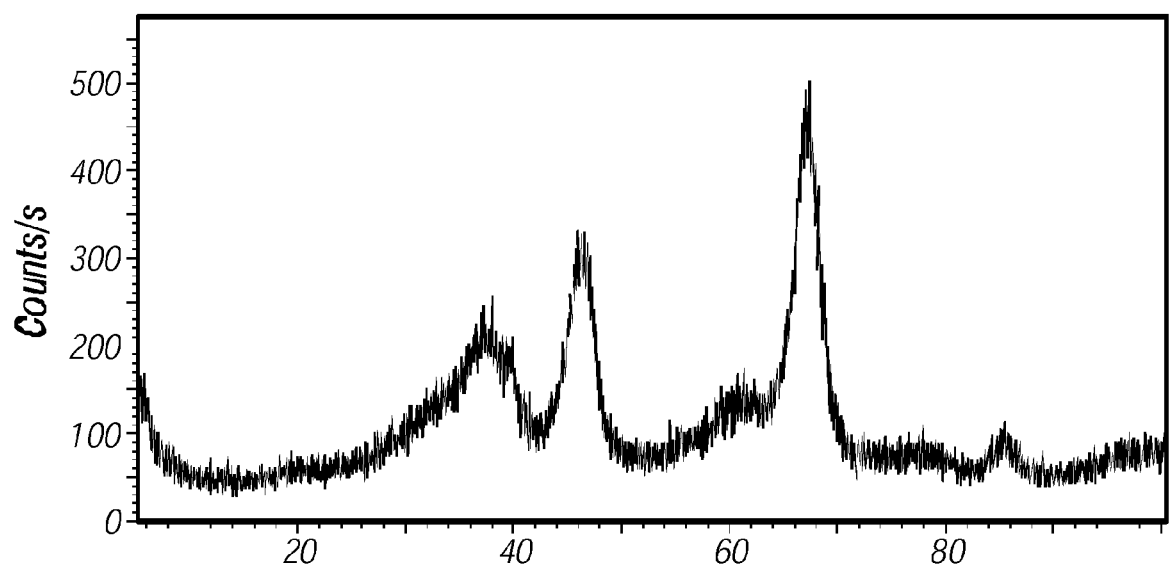

FIG. 2 presents the X-ray diffraction spectrum for a shaped support calcined at a calcination temperature of 850° F.

Figure 3:
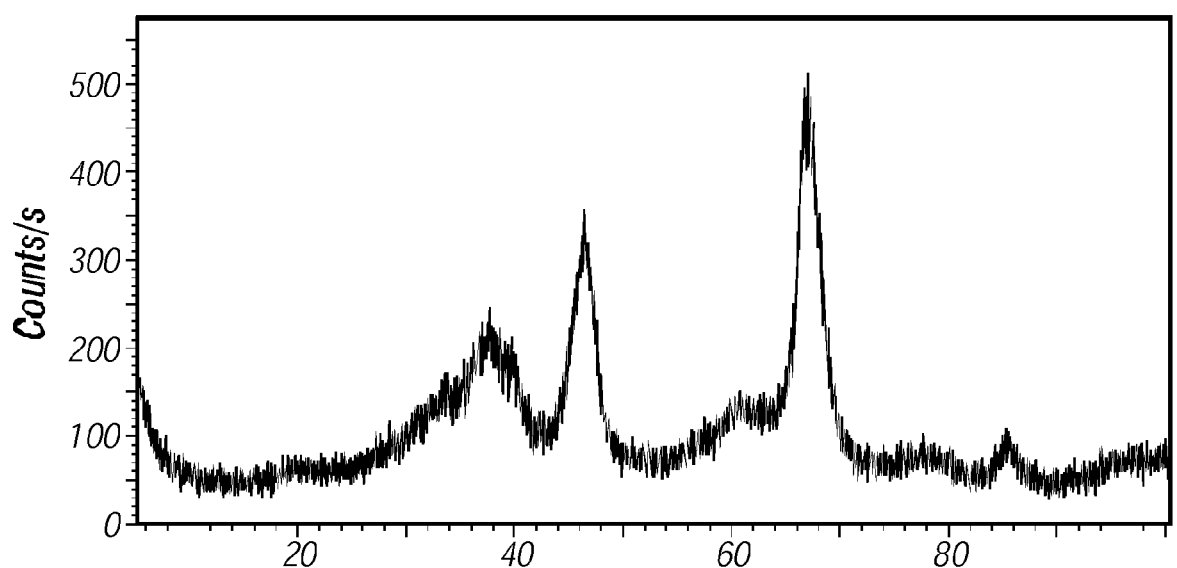

FIG. 3 presents the X-ray diffraction spectrum for a shaped support calcined at a calcination temperature of 900° F.

Figure 4:
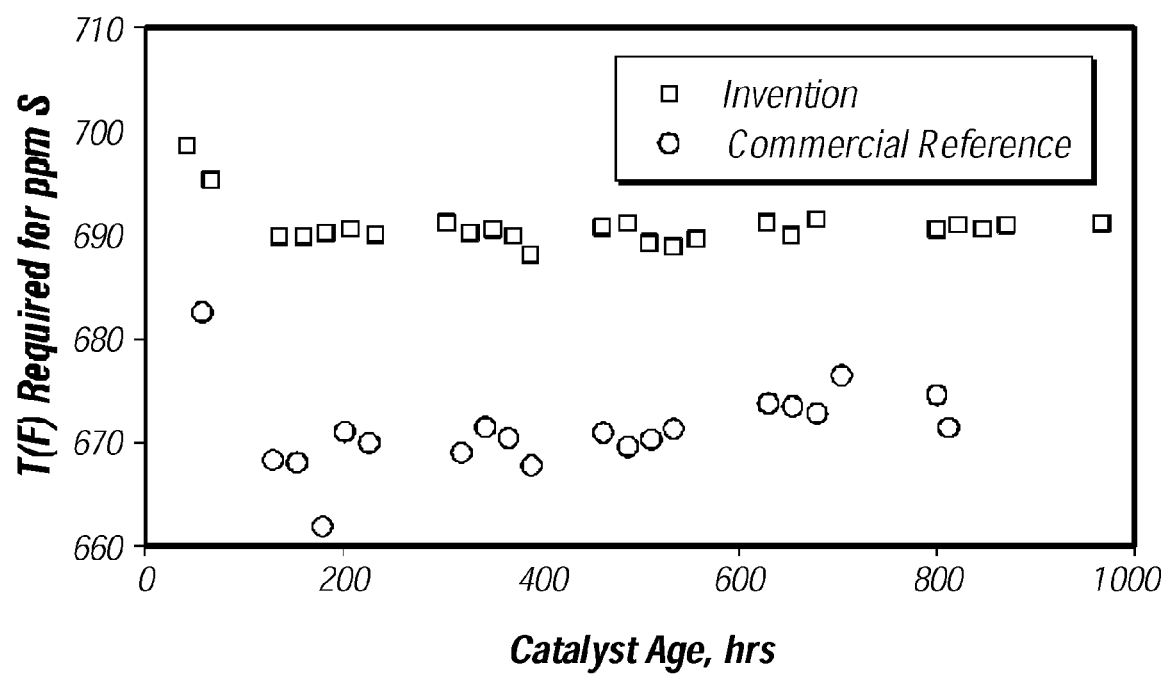

FIG. 4 presents plots of the reaction temperature required for the desulfurization of a diesel feed stock under certain test conditions to yield a diesel product having a 10 ppm sulfur concentration as a function of catalyst age for an inventive catalyst and for a comparative catalyst.

Figure 5:
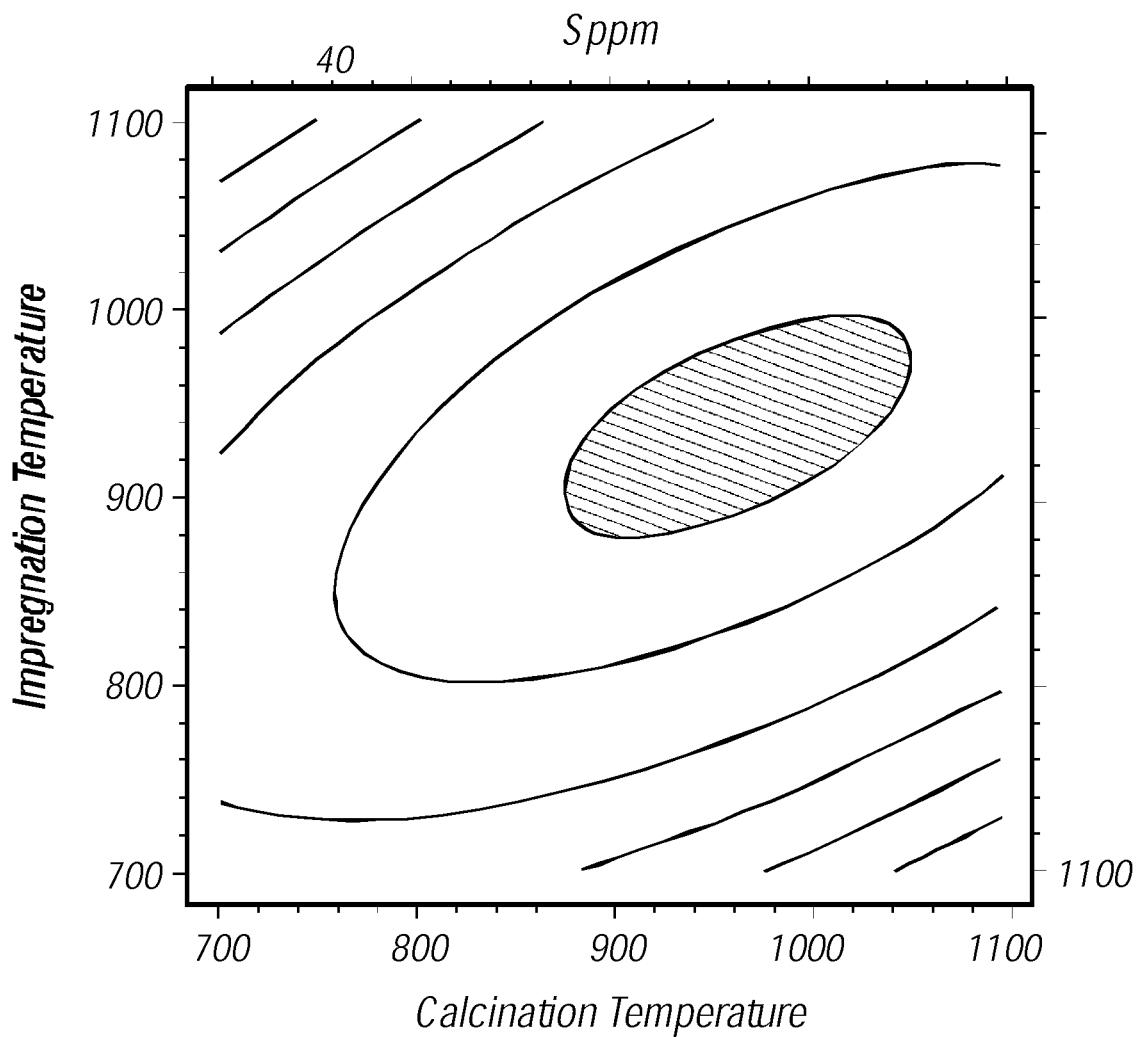

FIG. 5 presents a contour plot with each contour line representing a single sulfur concentration of a desulfurized middle distillate product resulting from the use of a catalyst made by an embodiment of the inventive method which uses a carefully controlled heat treatment of the catalyst support followed by a carefully controlled heat treatment of the impregnated heat treated catalyst support.

A novel catalyst composition has been discovered that has a particularly high activity when used in the hydrodesulfurization of a hydrocarbon distillate feed stock, such as, for example, diesel oil, that has a high concentration of sulfur or sulfur compounds such as organosulfur compounds. This catalyst composition can provide for significantly improved diesel desulfurization activity when compared to other known hydrodesulfurization catalyst compositions. It is especially useful in the manufacture of an ultra-low sulfur diesel product that has a sulfur concentration of less than 15 parts per million (ppm) and even less than 10 ppm or less than 8 ppm.

It has been discovered that the inventive high activity catalyst composition is a supported catalyst in which a hydrogenation component is supported on a specially made shaped support that comprises gamma ($\gamma$) alumina. This shaped support can have a material absence of the transition alumina phases of delta ($\delta$) alumina, theta ($\theta$) alumina and kappa ($\kappa$) alumina. The shaped support further can have a material absence of aluminum hydrate, and it can even further have a material absence of aluminum hydrate and transition alumina phases other than gamma alumina. Thus, the shaped support of the inventive catalyst composition can comprise gamma alumina and have a material absence of aluminum hydroxide and forms of transitional crystalline phases of alumina other than gamma alumina. Indeed, one important embodiment of the invention is that the shaped support, upon or into which is incorporated the hydrogenation catalytic component, has a material absence of the transitional crystalline phases of alumina, such as, for example, alpha ($\alpha$) alumina, delta ($\delta$) alumina, eta ($\eta$) alumina, kappa ($\kappa$) alumina, and theta ($\theta$) alumina, and additionally, a material absence of aluminum hydroxide, such as, for example, alpha mono aluminum monohydrate (boehmite).

A particularly important aspect of the inventive method for preparing the catalyst composition includes the use of certain starting materials and the formation of a shaped particle that is heat treated under carefully controlled temperature and heat treatment conditions so as to provide a heat treated shaped particle having the desired composition required for forming the final catalyst composition having high activity when used for the desulfurization of a distillate feed stock. The controlled heat treatment of the shaped particle is followed by the incorporation of the catalytic component into the heat treated shaped particle and a second carefully controlled temperature and heat treatment step.

The starting material used in preparing the shaped support particle of the catalyst composition is selected from among aluminum hydroxides, which are also referred to by those skilled in the art and herein as alumina hydrate or hydrated alumina, that when prepared and treated in accordance with the particular features of the inventive preparation method will provide a heat treated support particle and catalyst composition having a high hydrodesulfurization activity. Various aluminum hydroxides are commercially available, but the preferred aluminum hydroxide for use in preparing the shaped support particle is alpha alumina monohydrate, which is also referred to as boehmite, having the chemical formula $\alpha$-AlO(OH).

In general, the starting boehmite material used in the preparing the shaped support particle is in the form of a powder, and it is particularly desirable for the boehmite material to be a high purity boehmite with more than 98 percent and even more than 99 percent of the boehmite material being in the form of alpha alumina monohydrate. It is also desirable for the boehmite material to contain less than small amounts of impurities, such as, silicon dioxide ($SiO_2$), iron oxide ($Fe_2O_3$) and alkali ($Na_2O$) and alkaline earth (MgO) metals. For instance, the silicon dioxide should be present in the boehmite material at a concentration of less than 200 ppm, and, preferably, less than 150 ppm. But, typically, the silicon dioxide may be present in the range of from 80-130 ppm. The iron oxide should be present in the boehmite material at a concentration of less than 200 ppm, but, typically, the concentration may be present in the range of from 50 to 150 ppm. The alkali metal should be present at a concentration of less than 50 ppm, but, typically, it may be present in the range of from 5 to 40 ppm.

The shaped support of the starting material may be formed by any suitable method known to those skilled in the art; provided, that a shaped particle of the starting support material can be subsequently heat treated in accordance with the invention to provide a heat treated shaped support particle having the necessary properties of the invention. Examples of known shaping methods include tableting, pelletizing, and extrusion methods.

It is preferred to use an extrusion method to form the shaped support particle. To make the shaped support particle by this method, the starting aluminum hydroxide material is mixed with water and, if required, a suitable acid compound, in proportions and in a manner so as to form an extrudable paste suitable for extruding through an extrusion die to thereby form an extrudate. Generally, the weight ratio of aluminum hydroxide-to-water mixed together to form the extrudable paste is in the range of from 0.1:1 to 10:1, but, more typically, the weight ratio of aluminum hydroxide-to-water is in the range of from 0.5:1 to 5:1. The preferred weight ratio of aluminum hydroxide-to-water used to form the extrudable paste is in the range of from 0.75:1 to 3:1, and, most preferred, it is in the range of from 1:0 to 2:0.

The acid compound added to the mixture of aluminum hydroxide and water can be any suitable acid that assists in the formation of a suitable extrudable paste, and it is generally used to control the pH of the mixture to within the range of from 3 to 7. Strong mineral acids, such as nitric acid, may be used, but the preferred acid is acetic acid.

The formed extrudate used as the shaped support particle of the invention may have any cross-sectional shape such as cylindrical shapes, polylobal shapes or any other suitable shape. A typical size of extrudate has a cross-sectional diameter in the range of from about 1/10 inch to 1/32 inch and a length-to-diameter ratio in the range of from 2:1 to 5:1. The preferred shape is a tri-lobe.

It is an important aspect of the method of preparing the shaped support particle and the final catalyst composition of the invention for the shaped support particle to substantially entirely comprise aluminum hydroxide, exclusive of the water content. The preferred form of the aluminum hydroxide is boehmite, and especially preferred is high purity boehmite. Thus, the shaped particle will comprise at least 90 weight percent aluminum hydroxide, wherein the weight percent is based upon the dry weight of the shaped support particle, i.e., the weight percent is based on the total weight of the shaped support particle exclusive of the weight of the water contained in the shaped support particle. It is preferred, however, for the shaped particle to comprise at least 95 weight percent aluminum hydroxide, and, most preferred, the shaped particle can comprise at least 98 weight percent aluminum hydroxide.

The shaped support particle is then heat treated under treatment conditions that include the careful control of the temperature conditions so as to assure that the resulting heat treated shaped support particle does not contain undesirable amounts of delta alumina and theta aluminum and, even, other phases of alumina; and, preferably, so as to assure that essentially all the aluminum hydrate is converted to an alumina phase, which is preferably the gamma alumina phase. Therefore, the heat treatment temperature is controlled during the heat treatment of the shaped particle to within a specific temperature range to give a heat treated shaped particle having a material absence of the transition alumina phases of delta (δ) alumina, eta (η) alumina, theta (θ) alumina and kappa (κ) alumina. Through the carefully controlled heat treatment of the shaped support it further can have a material absence of aluminum hydroxide, and even a material absence of aluminum hydroxide and a material absence of transition alumina phases other than gamma alumina.

The temperature at which the heat treatment is conducted is controlled to within a narrow range and for a heat treatment time period so as to provide the heat treated shaped particle that has the properties as described herein. The temperature during the heat treatment be can controlled to within the range of from about 850° F. to about 950° F. for a heat treatment time period in the range of from about 0.5 hours to about 72 hours or even a longer time period as is required to provide the necessary conversion of the starting aluminum hydroxide material to the desired alumina phase. More specifically, the controlled temperature condition is controlled so that the heat treatment temperature does not exceed 940° F. so as to minimize the conversion of the starting aluminum hydroxide material to the undesirable delta alumina, eta alumina, theta alumina, kappa alumina, and alpha alumina phases. It is preferred for the controlled heat treatment temperature to not exceed 920° F., and, most preferred, the controlled heat treatment temperature should not exceed 910° F. In order to provide for the required conversion of the starting aluminum hydroxide material to the desirable alumina phase of gamma alumina, the controlled heat treatment temperature should exceed 850° F., and, preferably, the controlled heat treatment temperature should exceed 875° F. Most preferably, the controlled heat treatment temperature should exceed 890° F.

What is meant when referring herein to the "material absence" of a particular component of the heat treated shaped particle is that the relevant component is not present therein in an amount that significantly affects the ultimate catalytic properties of the final catalyst composition of the invention. It is believed that the significant presence of various phases of alumina other than gamma alumina and of aluminum hydrate in the heat treated shaped particle used to make the final catalyst composition can have a negative impact on the diesel hydrodesulfurization activity of the final catalyst composition. Thus, while small amounts of the alumina phases other than gamma alumina and of aluminum hydrate may be present in the heat treated shaped particle used in the preparation of the final catalyst composition, such amounts should be insignificant so that they do not materially negatively affect the activity of the final catalyst. But, in any event, less than 5 weight percent of the alumina of the heat treated shaped particle is in a crystalline alumina phase other than gamma alumina, such as the alumina phases of delta alumina, theta alumina, eta alumina, kappa alumina and alpha alumina, and preferably less than 2 weight percent, and, most preferably, less than 1 weight percent, of the alumina of the heat treated shaped particle is in a crystalline transitional phase other than gamma alumina.

It is also an important aspect of the invention that the heat treated shaped particle contain a material absence of aluminum hydroxide. Therefore, a substantial portion of the aluminum hydroxide contained in the shaped particle prior to its heat treatment should be converted by the heat treatment to a crystalline phase of alumina, preferably, gamma alumina. The heat treated shaped particle, thus, should contain an insubstantial amount of aluminum hydroxide, for instance, less than 5 weight percent based on the total weight of the heat treated shaped particle. Preferably, the heat treated shaped particle contains less than 2 weight percent, and, most preferably, less than 1 weight percent aluminum hydroxide.

The heat treated shaped particle has a specific pore structure including a characteristic median pore diameter, total pore volume and pore size distribution. Generally, the median pore diameter of the heat treated shaped particle is in the range of from about 70 angstroms to 120 angstroms, but, preferably, the median pore diameter is in the range of from 80 angstroms to 110 angstroms. More preferably, the median pore diameter of the heat treated shaped particle is in the range of from 90 angstroms to 100 angstroms.

The total pore volume of the heat treated shaped particle is generally in the range of from about 0.5 cubic centimeters per gram (cc/gram) to about 1.1 cc/gram. Preferably, the total pore volume is in the range of from 0.6 cc/gram to 1 cc/gram, and, most preferably, from 0.7 cc/gram to 0.9 cc/gram.

The percentage of the total pore volume contained in the pores of the heat treated shaped particle having a pore diameter less than 80 angstroms is less than 25 percent and, among these pores, less than 3 percent of the total pore volume of the heat treated shaped particle is in the pores having a diameter smaller than 50 angstroms. As for the pores having a diameter between 80 angstroms to 350 angstroms, more than 70 percent of the total pore volume of the heat treated shaped particle is contained in such pores. It is preferred, however, for at least 75 percent, and, most preferred, at least 80 percent, of the total volume to be in the pores having a diameter between 80 to 350 angstroms. Less than 3 percent of the total pore volume of the heat treated shaped particle is in the pores having a pore diameter greater than 350 angstroms.

The references herein to the pore size distribution and pore volume of the alumina support material are to those properties as determined by mercury penetration porosimetry. The measurement of the pore size distribution of the alumina support material is by any suitable measurement instrument using a contact angle of 140° with a mercury surface tension of 474 dyne/cm at 25° C.

Following the formation of the heat treated shaped particle, the catalytic components are incorporated into the heat treated shaped particle, which is thereafter subjected to a second heat treatment, again, under carefully controlled heat treatment conditions so as to assure that an insignificant amount of the alumina support is converted to undesirable crystalline alumina phases. Any suitable means or method may be used to incorporate the catalytic components into the heat treated shaped particle, but any of the known impregnation methods, such as, spray impregnation, soaking, multi-dip procedures, and incipient wetness impregnation methods, are preferred. The catalytic components include hydrogenation catalytic components such as those selected from Group 6 of the IUPAC Periodic Table of the Elements (e.g. chromium (Cr), molybdenum (Mo), and tungsten (W)) and Groups 9 and 10 of the IUPAC Periodic Table of the Elements (e.g. cobalt (Co) and nickel (Ni)). Phosphorus (P) is also a desired catalytic component.

The catalytic components may be incorporated into the heat treated shaped particle using one or more impregnation solutions containing one or more of the catalytic components. The preferred impregnation solution is an aqueous solution of the desired catalytic component or precursor thereof. In the case of a Group 9 or 10 metal, Group 9 or 10 metal acetates, carbonates, nitrates, and sulfates or mixtures of two or more thereof may be used, with the preferred compound being a metal nitrate such as nitrates of nickel or cobalt. In the case of a Group 6 metal, a salt of the Group 6 metal, which may be a precursor of the metal oxide or sulfide, may be used in the impregnation solution. Preferred are salts containing the Group 6 metal and ammonium ion, such as ammonium heptamolybdate and ammonium dimolybdate. The concentration of the metal compounds in the impregnation solution is selected so as to provide the desired metal concentration in the final catalyst composition of the invention. Typically, the concentration of the metal compound in the impregnation solution is in the range of from 0.01 to 100 moles per liter.

The amounts of catalytic metal compound and, if desired, phosphorous compound, incorporated or impregnated into the heat treated shaped particle is such that when the impregnated, heat treated shaped particle is subsequently subjected to a heat treatment, the final catalyst composition of the invention has the desired concentrations of the catalytic components. The amount of Group 6 metal contained in the final catalyst composition generally should be in the range of from about 3 to about 30, preferably from 4 to 27, and, most preferably, from 5 to 20 weight percent, calculated as a Group 6 metal trioxide and based on the total weight of the final catalyst composition inclusive of the catalytic components. The amount of Group 9 or 10 metal contained in the final catalyst composition generally should be in the range of from about 0.01 to about 10, preferably from 0.1 to 8, and, most preferably, from 1 to 6 weight percent, calculated as a Group 9 or 10 metal monoxide and based on the total weight of the final catalyst composition inclusive of the catalytic components. If the final catalyst contains a phosphorous component, it is present at a concentration in the range of from about 0.01 to about 5 weight percent, calculated as phosphorous.

The heat treatment of the impregnated heat treated shaped particle, as in the heat treatment of the shaped particle, is also conducted under carefully controlled heat treatment temperature conditions so as to assure that an insignificant portion of the alumina therein is converted to the undesirable crystalline transitional phases of alumina. Indeed, one embodiment of the invention includes the combined use of specific heat treatment conditions for each of the two heat treatment steps to provide the final catalyst having unexpectedly better middle distillate hydrodesulfurization catalytic performance. It has been found that an unexpected improvement in the desulfurization performance of the final catalyst is achieved when the temperature conditions of the second heat treatment step shifted to somewhat higher temperatures than those used in the first heat treatment step.

A final catalyst having especially good middle distillate desulfurization properties is obtained when the temperature range of the first heat treatment step to yield the heat treated particle is, as discussed above, from about 850° F. to about 950° F. and the temperature range of the second heat treatment step to yield the final catalyst is from about 870° F. to about 1000° F. A preferred temperature range at which the second heat treatment step is conducted is from 880° F. to 990° F., and, most preferred, from 900° F. to 980° F. The second heat treatment step is conducted for a time period necessary to provide the desired final catalyst composition and can generally be in the range of from about 0.5 hours to about 72 hours. Relative to the upper temperature limit for the first heat treatment step, the upper limit for the temperature for the second heat treatment step should be no more than about 35° C. (63° F.) above the upper temperature limit of the first heat treatment step, and, preferably, it is no more than 30° C. (54° F.). Most preferably, the upper temperature limit for the second heat treatment step in which the impregnated heat treated shaped particle is heat treated is no more than 25° C. (45° F.) of the upper temperature limit of the first heat treatment step.

The final catalyst composition, i.e., the impregnated heat treated shaped particle that itself has been heat treated, has a specific pore structure including a characteristic median pore diameter, total pore volume and pore size distribution. Generally, the median pore diameter of the final catalyst composition is in the range of from about 80 angstroms to 110 angstroms, but, preferably, the median pore diameter is in the range of from 85 angstroms to 105 angstroms. More preferably, the median pore diameter of the final catalyst composition is in the range of from 90 angstroms to 100 angstroms.

The total pore volume of the final catalyst composition is generally in the range of from about 0.6 cubic centimeters per gram (cc/gram) to about 1.1 cc/gram. Preferably, the total pore volume is in the range of from 0.65 cc/gram to 1 cc/gram, and, most preferably, from 0.7 cc/gram to 0.9 cc/gram.

The percentage of the total pore volume contained in the pores of the final catalyst composition having a pore diameter less than 80 angstroms is less than 25 percent and, among these pores, less than 3 percent of the total pore volume of the final catalyst composition is in the pores having a diameter smaller than 50 angstroms. As for the pores having a diameter between 80 angstroms to 350 angstroms, more than 70 percent of the total pore volume of the final catalyst composition is contained in such pores. It is preferred, however, for at least 75 percent, and, most preferred, at least 80 percent, of the total volume to be in the pores having a diameter between 80 to 350 angstroms. Less than 3 percent of the total pore volume of the final catalyst composition is in the pores having a pore diameter greater than 350 angstroms.

The catalyst composition of the invention is particularly suitable for use in a process for the hydrodesulfurization of a middle distillate hydrocarbon feed stock, having a concentration of sulfur or sulfur compounds, in order to make a low sulfur middle distillate hydrocarbon product. More specifically, the catalyst composition may be used in a process for the manufacture of an ultra-low sulfur diesel product having a sulfur concentration of less than 15 ppm, preferably, less than 10 ppm, and, most preferably, less than 8 ppm.

The middle distillate hydrocarbon feed stock as referred to herein is intended to include refinery hydrocarbon streams having boiling temperatures at atmospheric pressure in the range of from about 140° C. (284° F.) to about 410° C. (770° F.). These temperatures are approximate initial and final boiling temperatures of the middle distillate. Examples of the refinery streams intended to be included within the meaning of middle distillate hydrocarbon include straight run distillate fuels boiling in the referenced boiling range, such as, kerosene, jet fuel, light diesel oil, heating oil, and heavy diesel oil, and the cracked distillates, such as FCC cycle oil, coker gas oil, and hydrocracker distillates. The preferred feedstock of the inventive process is a middle distillate boiling in the diesel boiling range of from about 140° C. (284° F.) to about 400° C. (752° F.).

The sulfur concentration of the middle distillate feedstock can be a high concentration, for instance, being in the range of upwardly to about 2 weight percent of the middle distillate feedstock based on the weight of elemental sulfur and the total weight of the middle distillate feedstock inclusive of the sulfur compounds. Typically, however, the middle distillate feedstock of the inventive process has a sulfur concentration in the range of from 0.01 wt. % (100 ppm) to 1.8 wt. % (18,000 ppm). But, more typically, the sulfur concentration is in the range of from 0.1 wt. % (1000 ppm) to 1.6 wt. % (16,000 ppm), and, most typically, from 0.18 wt. % (1800 ppm) to 1.1 wt. % (11,000 ppm). It is understood that the references herein to the sulfur content of the distillate feedstock are to those compounds that are normally found in a distillate feedstock or in the hydrodesulfurized distillate product that contain a sulfur atom and generally include organosulfur compounds.

The final catalyst of the invention may be employed as a part of any suitable reactor system that provides for the contacting of the catalyst with the middle distillate feedstock under suitable hydrodesulfurization reaction conditions that include the presence of hydrogen and an elevated total pressure and temperature. Such suitable reactor systems can include fixed catalyst bed systems, ebullating catalyst bed systems, slurried catalyst systems, and fluidized catalyst bed systems. The preferred reactor system is that which includes a fixed bed of the inventive final catalyst composition contained within a reactor vessel equipped with an reactor feed inlet means, such as a feed inlet nozzle, for introducing the feedstock into the reactor vessel, and a reactor effluent outlet means, such as an effluent outlet nozzle, for withdrawing the reactor effluent or the low sulfur distillate product from the reactor vessel.

For the desulfurization of a diesel feedstock, having a sulfur concentration, the hydrodesulfurization reaction temperature is generally in the range of from about 200° C. (392° F.) to 420° C. (788° F.). The preferred hydrodesulfurization reaction temperature is in the range of from 260° C. (500° F.) to 400° C. (752° F.), and, most preferred, from 320° C. (608° F.) to 380° C. (716° F.). It is recognized that one of the unexpected features of the use of the inventive catalyst composition is that it has a higher hydrodesulfurization activity than certain conventional catalysts, and, thus, will in general provide for a comparatively lower process temperature than such conventional catalysts.

The inventive process generally operates at a hydrodesulfurization reaction pressure in the range of from about 100 psig to about 2000 psig, preferably, from 275 psig to 1500 psig, and, most preferably, from 290 psig to 1000 psig. The flow rate at which the distillate feedstock is charged to the reaction zone of the inventive process is generally such as to provide a liquid hourly space velocity (LHSV) in the range of from about 0.1 hr$^{-1}$ upwardly to about 10 hr$^{-1}$. The term "weight average space velocity", as used herein, means the numerical ratio of the rate at which the distillate feedstock is charged to the reaction zone of the process in volume per hour divided by the volume of catalyst composition contained in the reaction zone to which the distillate feedstock is charged. The preferred LHSV is in the range of from 0.1 hr$^{-1}$ to 250 hr$^{-1}$, and, most preferred, from 0.5 hr$^{-1}$ to 5 hr$^{-1}$.

The hydrogen treat gas rate is the amount of hydrogen charged to reaction zone with the distillate feedstock. The amount of hydrogen relative to the amount of distillate hydrocarbon feedstock charged to the reaction zone is in the range upwardly to about 10,000 cubic meters hydrogen per cubic meter of distillate hydrocarbon feedstock.

The desulfurized middle distillate product yielded from the process of the invention has a low or reduced sulfur concentration relative to the high sulfur concentration of the middle distillate feedstock. One particularly advantageous aspect of the inventive process is that it is capable of more economically providing for a deeply desulfurized diesel product or an ultra low sulfur diesel product. The low sulfur middle distillate product can have a sulfur concentration that is less than 25 ppm. The ultra low sulfur diesel product can have a sulfur concentration that is less than 15 ppm. Preferably, the low sulfur middle distillate product and ultra low sulfur diesel product has a sulfur concentration of less than 10 ppm, and, most preferably, less than 8 ppm.

The following examples are presented to further illustrate the invention, but they are not to be construed as limiting the scope of the invention.

EXAMPLE 1

This Example 1 describes the preparation of the alumina support used in the making of the final catalyst composition of the invention. The alumina support was calcined at various calcination temperatures in order to determine the effect that calcination temperature has on the properties of the calcined support used to make the final catalyst composition of the invention and upon the catalytic performance of the final catalyst composition of the invention.

The shaped support was prepared first by dissolving 150 parts by weight $Ni(NO_3)_2 \cdot 6H_2O$ in 52 parts by weight deionized water with heating to form a nickel nitrate solution.

The nickel nitrate solution was mixed with 3000 parts by weight (on dry basis) of wide pore alumina and 30 parts by weight Superfloc 16 extrusion aid using a muller mixer. The components were mixed for a sufficient period of time to provide an extrudable paste. The resulting paste was extruded through 1.3 mm extrusion dies to form extrusion particles of the shaped support.

A 700 gram sample of the shaped support was calcined at a temperature of 750° F. in a muffle furnace for a time period of two hours to thereby provide a calcined shaped support (Sample A).

700 gram sample of the shaped support was calcined at a temperature of 850° F. in a muffle furnace for a time period of two hours to thereby provide a calcined shaped support (Sample B).

A 700 gram sample of the shaped support was calcined at a temperature of 900° F. in a muffle furnace for a time period of two hours to thereby provide a calcined shaped support (Sample C).

Presented in Table 1 are certain of the physical properties of the calcined samples described above. Presented in Table 2 is the pore size distribution as determined by mercury porosimetry of the calcined samples.

TABLE 1

Various properties of the samples of shaped support calcined at different temperatures.

| | Calcination Temperature | | |
|---|---|---|---|
| Pore Diameter (Å) | 750° F. (399° C.) | 850° F. (454° C.) | 900° F. (482° C.) |
| less than 50 | 2.14 | 1.50 | 1.27 |
| 50-60 | 4.32 | 2.76 | 1.97 |
| 60-70 | 9.68 | 6.18 | 4.32 |
| 70-80 | 19.33 | 15.47 | 10.81 |
| 80-90 | 22.87 | 22.65 | 21.11 |
| 90-100 | 29.14 | 31.04 | 31.15 |
| 100-110 | 5.68 | 12.98 | 19.56 |
| 110-120 | 1.24 | 1.78 | 3.45 |
| 120-130 | 0.62 | 0.68 | 0.92 |
| 130-140 | 0.61 | 0.49 | 0.54 |
| 140-150 | 0.44 | 0.41 | 0.48 |
| 150-160 | 0.32 | 0.33 | 0.41 |
| 160-170 | 0.27 | 0.31 | 0.40 |
| 170-180 | 0.25 | 0.25 | 0.22 |
| 180-210 | 0.58 | 0.63 | 0.71 |
| 210-280 | 0.73 | 0.73 | 0.95 |
| 280-350 | 0.43 | 0.43 | 0.51 |
| greater than 350 | 1.36 | 1.36 | 1.22 |

TABLE 2

Pore size distribution of samples of shaped support calcined at different temperatures.

| | 750° F. | 850° F. | 900° F. |
|---|---|---|---|
| Surface Area (M²/g) | 320.8 | 296.6 | 304.71 |
| Median Pore Diameter (Å) | 87 | 91 | 94 |
| Total Hg Pore Volume (cc/g) | 0.752 | 0.751 | 0.772 |
| $H_2O$ Pore Volume (ml/g) | 0.77 | 0.82 | 0.825 |

FIGS. 1, 2 and 3 each presents the X-ray diffraction spectrum for each of the samples of shaped support calcined at the different temperatures (i.e., Sample A, Sample B and Sample C). As may be observed from the spectra of the figures, the spectrum of Sample C (FIG. 3) indicates that it has no significant amount of boehmite present; however, the spectra for Samples A (FIG. 1) and B (FIG. 2) indicate that they both contain a significant amount of boehmite. Also, the spectrum of Sample C indicates that it is predominantly gamma alumina with little, if any, amounts of other phases of alumina being present.

EXAMPLE 2

This Example 2 describes the preparation of catalyst compositions using the calcined samples described in Example 1. These catalyst compositions were used in the hydrodesulfurization activity tests presented in the following Example 3.

The catalyst compositions were prepared by impregnating the samples of Example 1 with an impregnation solution followed by drying the impregnated samples and calcination of the dried, impregnated samples. The impregnation solution was prepared by combining within a container vessel 34 parts by weight molybdenum trioxide ($MoO_3$), 8 parts by weight of 86.1% phosphoric acid ($H_3PO_4$), and 77 parts by weight deionized water. The mixture was heated to 180° F. followed by the addition of 9 parts by weight cobalt hydroxide (Co$(OH)_2$). The solution was then heated to 212° F. followed by the addition of 4 parts by weight citric acid monohydrate. The container was then covered and the solution was heated until it became clear. The container was then uncovered and the solution was heated to reduce the volume thereof.

EXAMPLE 3

This Example 3 describes the experimental procedure used to measure the performance of certain catalyst compositions prepared as described in the above Examples 1 and 2 in the hydrodesulfurization of a diesel feedstock having a high concentration of sulfur (1.6 wt. %).

A laboratory stainless steel isothermal tube reactor, having a nominal diameter of ¾ inch, was packed with a 100 cc volume of the relevant catalyst. As a part of the startup of the reactor, the catalyst was presulfided by adding 68 grams of TNPS to 1000 grams of the feedstock. The feed was introduced to the reactor at a rate so as to provide an LHSV of 1 hr$^{-1}$, and hydrogen was introduced at a rate of 19.6 liters/hr. The reactor temperature was ramped up over a 5 hour period to 400° F. and held at 400° F. for a period of 4 hours. Thereafter, the temperature was ramped up to 650° F. over a 4 hour period and then held at 650° F. for two hours. After the catalyst was presulfided, the feed to the reactor was switched to an unspiked feedstock. The feedstock used was a straight run gas oil containing 1.6 weight percent sulfur having ASTM D2887 distillation as presented in the following Table 3.

TABLE 3

Distillation Temperature of Straight Run Gas Oil Feedstock

| % | Temp (° F.) |
|---|---|
| T0 | 312 |
| T10 | 455 |
| T50 | 563 |
| T90 | 649 |
| T100 | 696 |

The reactor was operated at a pressure of 300 psig, the feed rate was adjusted to provide a liquid hourly space velocity of 0.5, and the hydrogen gas feed rate was 1200 standard cubic feed per barrel of feed (based at 60° F.). The reactor temperature was adjusted so as to provide an ultra low sulfur diesel product having a sulfur concentration of 10 ppmw.

FIG. 4 presents plots of the reaction temperature required for the desulfurization of the gas oil feedstock to yield a product having a sulfur concentration of 10 ppmw as a function of the age for a representative inventive catalyst and for a comparative catalyst. As can be seen from the plots, the inventive catalyst demonstrates a significantly higher hydrodesulfurization activity than does the comparative catalyst by requiring a lower hydrodesulfurization temperature, which in some cases is as much as 20° F. to 30° F. lower.

EXAMPLE 4

This Example 4 describes, in general, the approach used to develop a prediction model for predicting the sulfur concentration of a desulfurized middle distillate feedstock obtained using various catalysts prepared generally in accordance with the method as described in Example 2.

Final catalyst compositions were made using supports prepared as described in Example 1 that were calcined at different temperatures ranging from 750° F. to 1100° F. These supports were impregnated with catalytic components followed by drying and then calcining the impregnated support material at different temperatures ranging from 750° F. to 1050° F. Each of the compositions was tested for its ability to desulfurize a middle distillate feedstock having a high sulfur concentration.

A graphical representation of the results of this study is presented in the contour plot of FIG. 5. The X-axis of the contour plot is the temperature at which the support material used in the preparation of the final catalyst was calcined, and the Y-axis is the temperature at which the impregnated calcined support material was calcined. Each contour line represents a sulfur concentration of the desulfurized middle distillate feedstock resulting from the use of a final catalyst composition prepared using the inventive two-step heat treatment method at the two different calcination temperatures. The contour lines are a best fit of a number of data points used to generate the contour plot.

As illustrated by the contour plot, the best performing catalysts, based on their properties for middle distillate desulfurization, are those prepared using a support material calcined at a calcination temperature in the range of from about 850° F. to 1000° F., which the calcined support material has been impregnated, dried and calcined at a temperature in the range of from about 880° F. to 1000° F.

It is understood that while particular embodiments of the invention have been described herein, reasonable variations, modifications and adaptations thereof may be made that are within the scope of the described disclosure and the appended claims without departing from the scope of the invention as defined by the claims.

That which is claimed is:

1. A method of making a catalyst composition suitable for use in the manufacture of ultra low sulfur diesel, said method comprises:
   mixing a high purity boehmite starting material comprising more than 98 percent alpha alumina monohydrate in the form of a powder with water in a weight ratio of boehmite-to-water of from 0.1:1 to 10:1, wherein said high purity boehmite starting material has impurities of less than 200 ppm silicon dioxide and less than 200 ppm iron oxide;
   forming a shaped particle from said mixture comprising at least 90 weight percent, exclusive of water, boehmite;
   heat treating said shaped particle under a controlled temperature condition to convert said boehmite of said shaped particle to gamma-alumina;
   controlling said controlled temperature condition to within a calcination temperature range of from about 850° F. and 950° F. so as to convert said boehmite to a crystalline transitional phase of alumina that includes less than 5 weight percent of a transitional crystalline phase of alumina other than gamma alumina, thereby providing a heat treated shaped particle;
   incorporating a hydrogenation catalytic component into said heat treated shaped particle to thereby provide an impregnated heat treated shaped particle; and
   heat treating said impregnated heat treated shaped particle at a temperature of from about 870° F. to about 1000° F., to thereby provide a catalyst composition capable of desulfurizing a distillate feedstock to a sulfur concentration of less than 15 parts per million.

2. A method as recited in claim 1, wherein said controlled temperature condition provides for the conversion of said boehmite such that heat treated shaped particle contains less than 5 weight percent boehmite with the weight percent being based on the total weight of said heat treated shaped particle.

3. A method as recited in claim 2, wherein said heat treated shaped particle contains less than 2 weight percent boehmite with the weight percent being based on the total weight of said heat treated shaped particle.

4. A method as recited in claim 3, wherein less than 2 weight percent of said alumina of said heat treated shaped particle is said transitional crystalline phase of alumina other than gamma alumina.

5. A method as recited in claim 4, wherein the median pore diameter of said heat treated shaped particle is in the range of from about 70 angstroms to about 120 angstroms, wherein the total pore volume of said heat treated shaped particle is in the range of from about 0.5 cc/gram to about 1.1 cc/gram, and wherein more than 70 percent of the total pore volume of said heat treated shaped particle is contained in the pores having a pore diameter of from 70 angstroms to 350 angstroms.

6. A method as recited in claim 5, wherein said hydrogenation catalytic component is selected from the group of consisting of molybdenum compounds, cobalt compounds, nickel compounds, phosphorous compounds, and any combination of one or more of such compounds.

7. A method as recited in claim 6, wherein said heat treating of said impregnated heat treated shaped particle is conducted so that the at least 90 weight percent of the alumina of said catalyst composition is in the crystalline transitional phase of gamma alumina and less than 1 weight percent of the alumina of said catalyst composition is in the crystalline transitional phase other than gamma alumina.

8. A method as recited in claim 7, wherein said catalyst composition is characterized as having a median pore diameter in the range of from about 80 angstroms to about 110 angstroms, a total pore volume in the range of from about 0.6 cc/gram to about 1.1 cc/gram, and more than 70 percent of said total pore volume that is contained in the pores having a pore diameter of from 80 angstroms to 350 angstroms.

9. A method as recited in claim 8, wherein said catalyst composition further comprises a molybdenum compound in the range of from about 3 to about 30 weight percent, calculated as molybdenum trioxide, a cobalt compound in the range of from about 0.01 to about 10 weight percent, calculated as cobalt oxide, and a phosphorous compound in the range of from about 0.01 weight percent to about 5 weight percent, calculated as phosphorous.

10. A method of making a catalyst composition suitable for use in the manufacture of ultra low sulfur diesel, said method comprises:

mixing a high purity boehmite starting material comprising more than 98 percent alpha alumina monohydrate in the form of a powder with water in a weight ratio of boehmite-to-water of from 0.1:1 to 10:1, wherein said high purity boehmite starting material has impurities of less than 200 ppm silicon dioxide and less than 200 ppm iron oxide;

forming a shaped particle from said mixture comprising at least 95 weight percent, exclusive of water, boehmite;

calcining said shaped particle under a controlled temperature condition to convert said boehmite of said shaped particle to gamma-alumina;

controlling said controlled temperature condition to within a calcination temperature range of from about 850° F. and 950° F. so that essentially all of said boehmite of said shaped particle is converted to gamma-alumina, with less than 5 weight percent of said boehmite of said shaped particle being converted to a crystalline transitional phase other than gamma-alumina to thereby provide a calcined shaped particle;

impregnating said calcined shaped particle with a hydrogenation catalytic component to thereby provide an impregnated calcined shaped particle; and calcining said impregnated calcined shaped particle at a temperature of from about 880 ° F. to 990° F. to thereby provide a catalyst composition capable of desulfurizing a distillate feedstock to a sulfur concentration of less than 15 parts per million.

11. A method as recited in claim 10, wherein said calcined shaped particle has less than 5 weight percent boehmite with the weight percent being based on the total weight of said calcined shaped particle.

12. A method as recited in claim 11, wherein said calcined shaped particle contains less than 2 weight percent boehmite with the weight percent being based on the total weight of said calcined shaped particle.

13. A method as recited in claim 12, wherein less than 2 weight percent of said alumina of said calcined shaped particle is said transitional crystalline phase of alumina other than gamma alumina.

14. A method as recited in claim 13, wherein the median pore diameter of said calcined shaped particle is in the range of from about 80 angstroms to about 110 angstroms, wherein the total pore volume of said calcined shaped particle is in the range of from about 0.6 cc/gram to about 1.1 cc/gram, and wherein more than 70 percent of the total pore volume of said calcined shaped particle is contained in the pores having a pore diameter of from 80 angstroms to 350 angstroms.

15. A method as recited in claim 14, wherein said hydrogenation catalytic component is selected from the group of consisting of molybdenum compounds, cobalt compounds, nickel compounds, phosphorous compounds, and any combination of one or more of such compounds.

16. A method as recited in claim 15, wherein said calcining of said impregnated calcined shaped particle is conducted so that the at least 90 weight percent of the alumina of the resulting said catalyst composition is in the crystalline transitional phase of gamma alumina and less than 1 weight percent of the alumina of said catalyst composition is in the crystalline transitional phase other than gamma alumina.

17. A method as recited in claim 16, wherein said catalyst composition is characterized as having a median pore diameter in the range of from about 80 angstroms to about 110 angstroms, a total pore volume in the range of from about 0.6 cc/gram to about 1.1 cc/gram, and more than 70 percent of said total pore volume that is contained in the pores having a pore diameter of from 80 angstroms to 350 angstroms.

18. A method as recited in claim 17, wherein said catalyst composition further comprises a molybdenum compound in the range of from about 2 to about 10 weight percent, calculated as molybdenum trioxide, a cobalt compound in the range of from about 0.01 to about 10 weight percent, calculated as cobalt oxide, and a phosphorous compound in the range of from about 0.01 weight percent to about 5 weight percent, calculated as phosphorous.

19. A method as recited in claim 1, wherein an acid is used to control the pH of said boehmite and water mixture to within the range of from 3 to 7.

20. A method as recited in claim 19, wherein the acid used to control the pH of said boehmite and water mixture is selected from the group consisting of nitric acid and acetic acid.

21. A method as recited in claim 10, wherein more than 99 percent of said high purity boehmite starting material is in the form of alpha alumina monohydrate.

22. A method as recited in claim 1, wherein said impregnated heat treated shaped particle is heat treated at a temperature of from about 880° F. to 990° F.

* * * * *